US012662358B2

(12) United States Patent
Chen et al.

(10) Patent No.: US 12,662,358 B2
(45) Date of Patent: Jun. 23, 2026

(54) LIFTING MECHANISM FOR GYM EQUIPMENT

(71) Applicant: XIAMEN MYDO SPORTS EQUIPMENT CO., LTD, Fujian (CN)

(72) Inventors: Jinshui Chen, Fujian (CN); Bingwen Liu, Fujian (CN); Jianzhong Wei, Fujian (CN)

( * ) Notice: Subject to any disclaimer, the term of this patent is extended or adjusted under 35 U.S.C. 154(b) by 301 days.

(21) Appl. No.: 18/596,658

(22) Filed: Mar. 6, 2024

(65) Prior Publication Data

US 2024/0217789 A1 Jul. 4, 2024

(30) Foreign Application Priority Data

Sep. 27, 2023 (CN) ......................... 202322637370.3
Nov. 3, 2023 (CN) ......................... 202322978367.8

(51) Int. Cl.
*B66F 3/12* (2006.01)
*B66F 3/08* (2006.01)
*B66F 3/44* (2006.01)

(52) U.S. Cl.
CPC .................. *B66F 3/12* (2013.01); *B66F 3/44* (2013.01); *B66F 3/08* (2013.01); *B66F 2700/04* (2013.01)

(58) Field of Classification Search
CPC .... B66F 3/005; B66F 3/12; B66F 3/08; B66F 3/44; B66F 7/025; B66F 7/24; B66F 2700/04
See application file for complete search history.

(56) References Cited

U.S. PATENT DOCUMENTS

2020/0298599 A1* 9/2020 Tsuchiya .................. B66F 3/12

* cited by examiner

*Primary Examiner* — Christopher J. Besler

(57) ABSTRACT

A lifting mechanism for gym equipment to provide height adjustment of the gym equipment and reduction of the thickness of the mechanism, having a bracket, a bearing rotational shaft, bearing wheels, a sleeve pipe, and a driver; the bracket is mounted to a gym equipment structural frame; the bearing rotational shaft is rotationally mounted between two ends of the bracket, a peripheral surface of the bearing rotational shaft is connected to linkage arms orienting to a same direction, and a wheel is mounted to each linkage arm; the sleeve pipe is pivotally connected to the bracket; the driver is pivotally connected to the bracket; an output end of the driver is a screw bolt; the screw bolt passes through the sleeve pipe.

9 Claims, 6 Drawing Sheets

LIFTING MECHANISM FOR GYM EQUIPMENT

BACKGROUND OF THE INVENTION

The present invention relates to the technical field of gym equipment, and more specifically relates to a lifting mechanism for gym equipment.

Indoor gym equipment is a major kind of fitness product in the market for body exercises to maintain health.

Conventional gym equipment usually has a fixed base which barely allows for partial elevation nor can it be titled to form an exercising platform. Accordingly, its use is not diversified and cannot meet the ever changing consumer's demands. In the prior art, a lifting mechanism can be provided at the base of the gym equipment to enable, at least partially, manual or automatic height adjustment of the gym equipment or tilting angle adjustment of an exercising platform. However, the base mounted with the lifting mechanism will increase the thickness of the gym equipment, leading to larger and also more difficult packaging, and also increasing transportation and storage costs.

BRIEF SUMMARY OF THE INVENTION

In view of the aforesaid disadvantages in the prior art, the present invention provides a lifting mechanism for gym equipment. The present invention provides lifting function for the gym equipment and at the same time reduces a thickness of the gym equipment so as to lower packaging, transportation, and storage costs.

To attain the above objects, the present invention provides the following technical solutions:

A lifting mechanism for gym equipment, comprising a bracket, a bearing rotational shaft, bearing wheels, a sleeve pipe, and a driver; the bracket is configured to be removably mounted to a gym equipment structural frame; the bearing rotational shaft is rotationally mounted between two ends of the bracket, and is also positioned parallel to the bracket; a peripheral surface of the bearing rotational shaft is fixedly connected with a first pivot base and a plurality of linkage arms; the plurality of linkage arms are oriented to a same direction; and each of the linkage arms is rotationally mounted with a corresponding bearing wheel; the sleeve pipe is pivotally connected to the first pivot base; the driver is pivotally connected to the bracket; an output end of the driver is a screw bolt; the screw bolt passes through the sleeve pipe and being in threaded connection with the sleeve pipe.

The bracket comprises a lateral rod; two ends of the lateral rod are connected with two connecting rods respectively; the two connecting rods are parallel to each other; an upper surface of each of the connecting rods is configured to be detachably mounted to the gym equipment structural frame; one end of each of the connecting rods is connected with a corresponding end of the lateral rod of the bracket so that each of the connecting rods is perpendicular to the lateral rod of the bracket, another end of each of the connecting rods is connected to a corresponding end of the bearing rotational shaft so that the bearing rotational shaft is rotationally mounted between the two connecting rods.

A second pivot base is fixedly connected to the bracket at a position corresponding to the first pivot base of the bearing rotational shaft; the driver is pivotally connected to the second pivot base.

Preferably, both the first pivot base and the second pivot base are located on a central axis of the bracket; a central axis of the screw bolt coincides with the central axis of the bracket.

Preferably, a pivot point between the second pivot base and the driver and a pivot point between the first pivot base and the sleeve pipe are located above an upper surface of the lateral rod of the bracket.

Preferably, the plurality of linkage arms are mounted on the peripheral surface of the bearing rotational shaft proximal to two ends of the bearing rotational shaft respectively; the plurality of linkage arms are oriented to the same direction; one end of each of the linkage arms is fixedly connected to the peripheral surface of the bearing rotational shaft, and another end of each of the linkage arms is mounted with a corresponding bearing wheel.

Preferably, said another end of each of the linkage arms is also mounted with a U-shaped blocking piece covering a top side of the corresponding bearing wheel.

The driver comprises a electric motor and a driver base; the driver base is pivotally connected to the bracket; the screw bolt is rotationally inserted into a surface of the driver base facing towards the bearing rotational shaft; the electric motor is mounted at one lateral side of the driver base; the electrical motor is connected with the screw bolt to transmit motion to the screw bolt.

Preferably, a bearing is mounted on the driver base; one end of the screw bolt is rotationally mounted in the bearing.

According to the above technical solutions, the present invention has the following technical effects:

1) when the screw bolt at the output end of the driver rotates, the sleeve pipe is driven to move axially on the screw bolt, thus driving the bearing rotational shaft to rotate; since the first pivot base and the plurality of linkage arms are fixedly connected with the bearing rotational shaft, rotation of the bearing rotational shaft will also rotate the bearing wheels which will then be driven to move axially forth or back, and such axial movement of the bearing wheels will lift up or lower the bearing rotational shaft; while the bearing rotational shaft is being lifted up or being lowered, a distance between the bearing rotational shaft and the gym equipment structural frame remains unchanged, thus the gym equipment can be adjusted to be lifted or lowered.
2) Since the screw bolt and the sleeve pipe are in threaded connection, self-locking can be achieved so that the gym equipment can be adjusted to a height as desired with structural stability, thus enhancing the safety of use of the gym equipment.
3) Further, since connections between the sleeve pipe, the first pivot base, the bearing rotational shaft, the linkage arms and the bearing wheels are all fixed except that the sleeve pipe is pivotally connected to the first pivot base, lifting up of the bearing wheels to fold against the gym equipment structural frame through the pivotal connection between the sleeve pipe and the first pivot base will thus carry the linkage arms, the bearing rotational shaft, and also the first pivot base together to fold against the gym equipment structural frame; alternatively, the bracket may be dismounted from the gym equipment structural frame; both ways as described above can reduce the thickness of the gym equipment, thereby lowering the packaging, transportation, and storage costs.
4) Moreover, since the bracket can be dismounted from the gym equipment structural frame, the present invention can be independent from the gym equipment structural frame, meaning that the present invention can be additionally mounted to the gym equipment to modify the gym equipment without the need to replace a new gym equipment structural frame which is specifically designed to be adaptable to the present invention.

DETAILED DESCRIPTION OF THE INVENTION

To further explain the technical solutions of the present invention, the present invention is further described in detail below with reference to the accompanying drawings.

Figure 1:
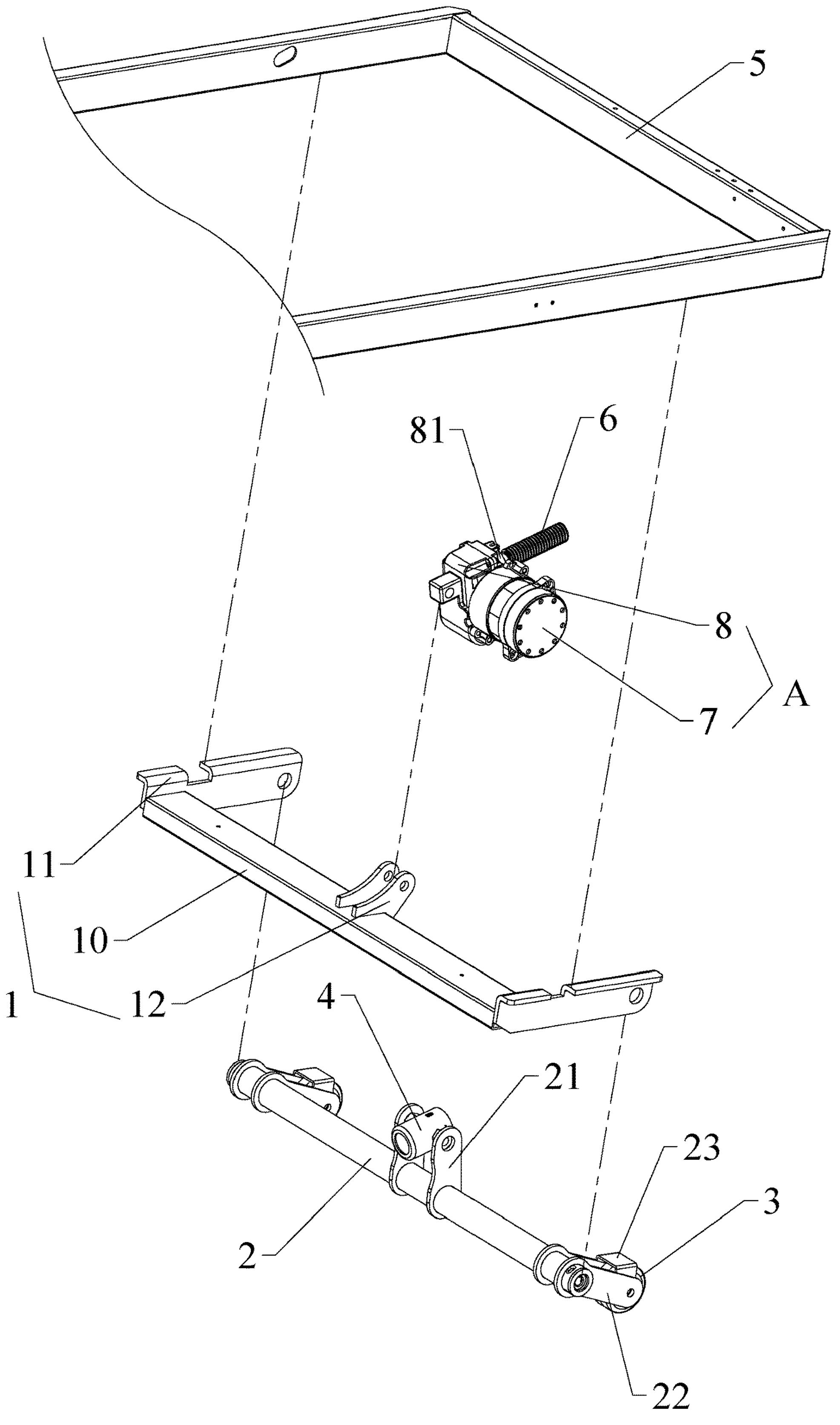
FIG. 1 is an exploded view according to an embodiment of the present invention.
Figure 2:
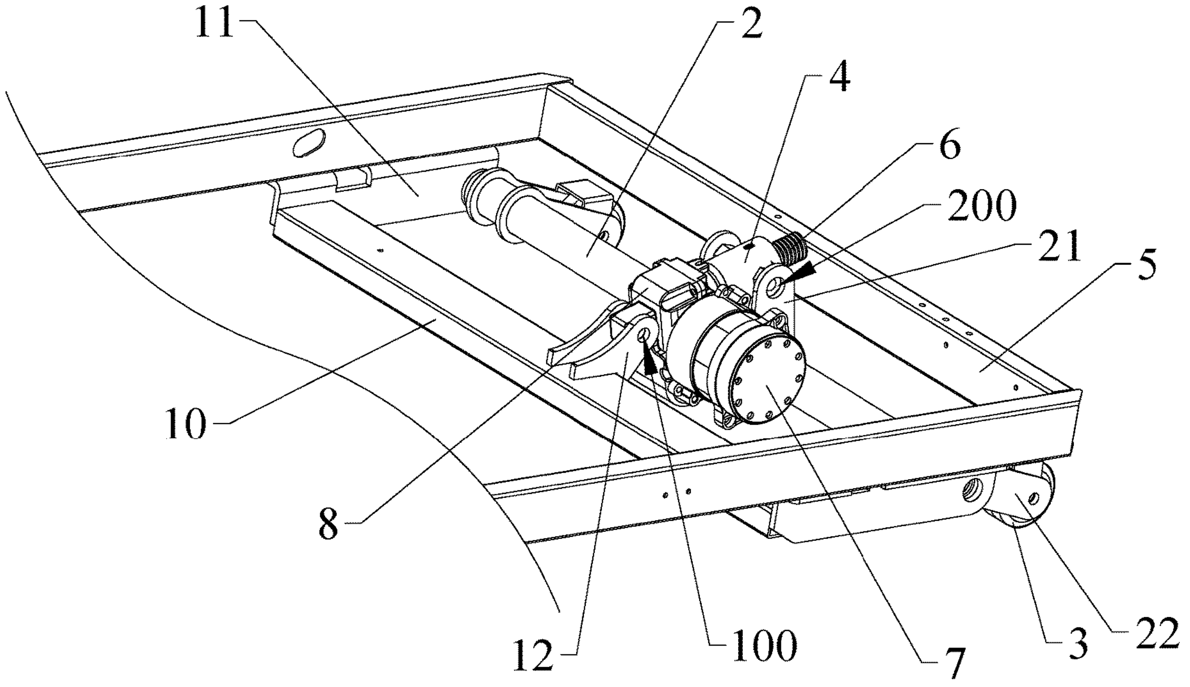
FIG. 2 is a first perspective view according to an embodiment of the present invention.
Figure 3:
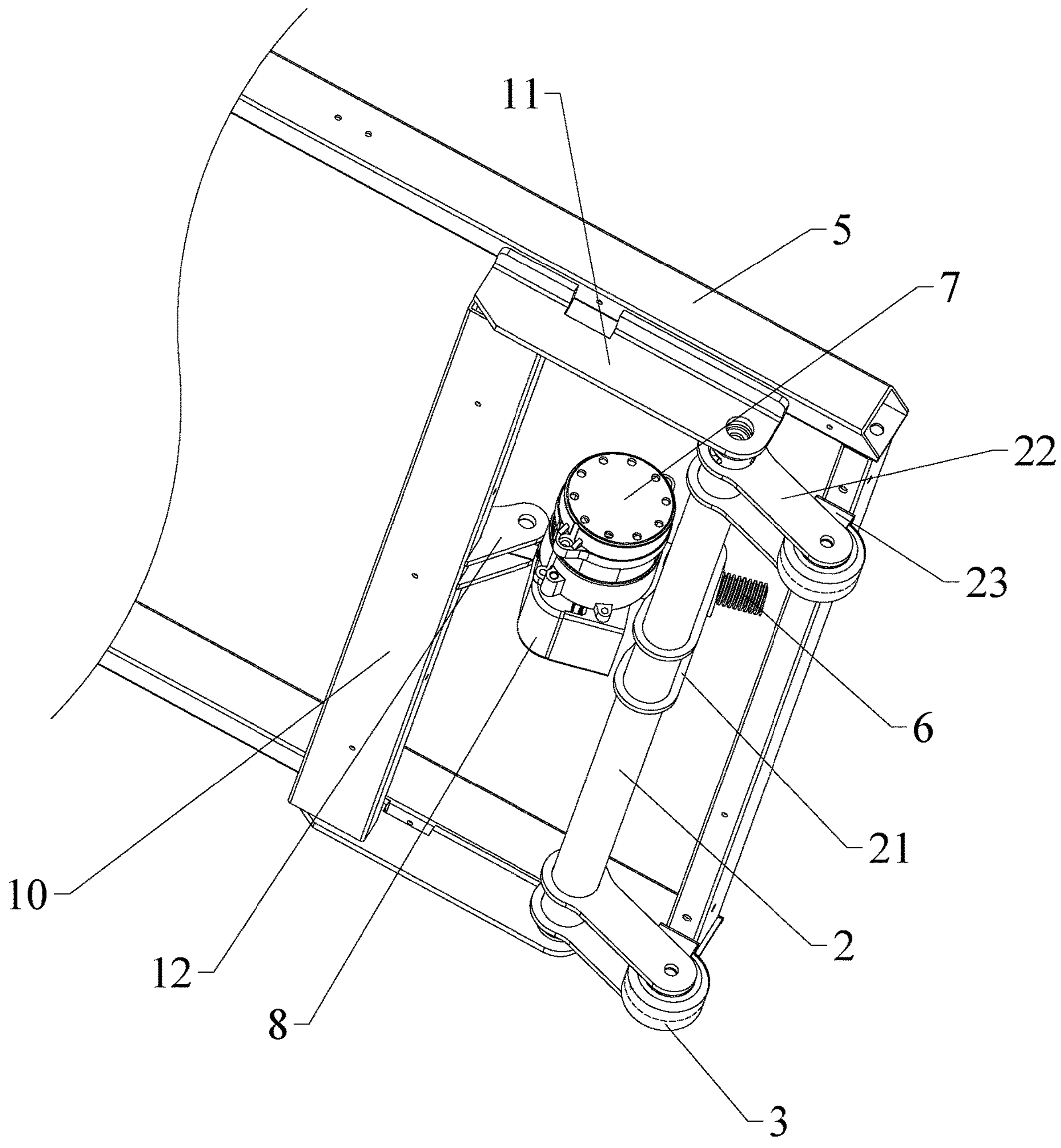
FIG. 3 is a second perspective view according to an embodiment of the present invention.
Figure 4:
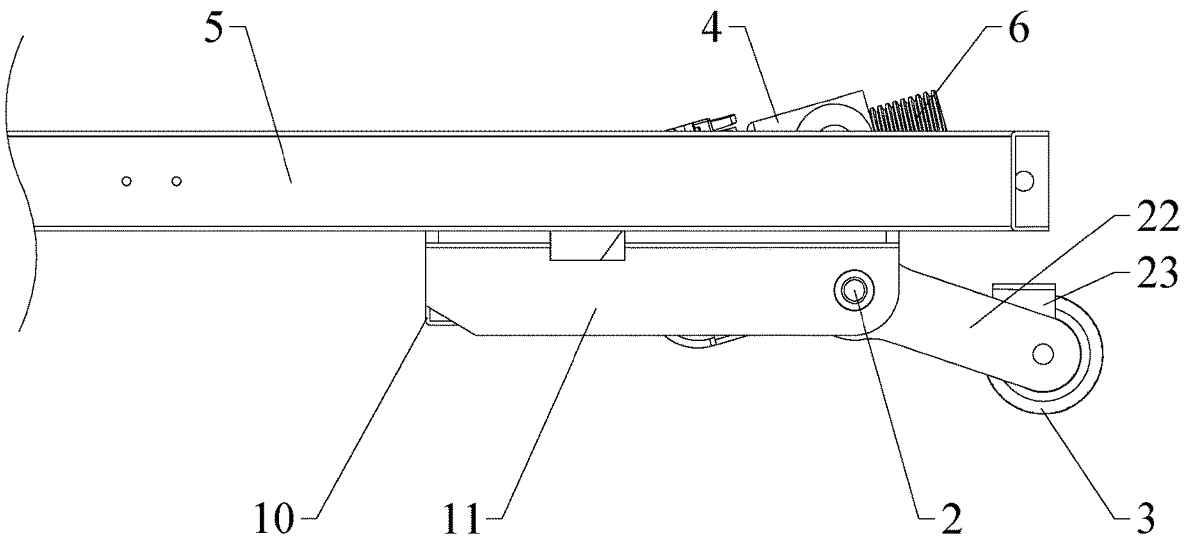
FIG. 4 is a side view according to an embodiment of the present invention.
Figure 5:
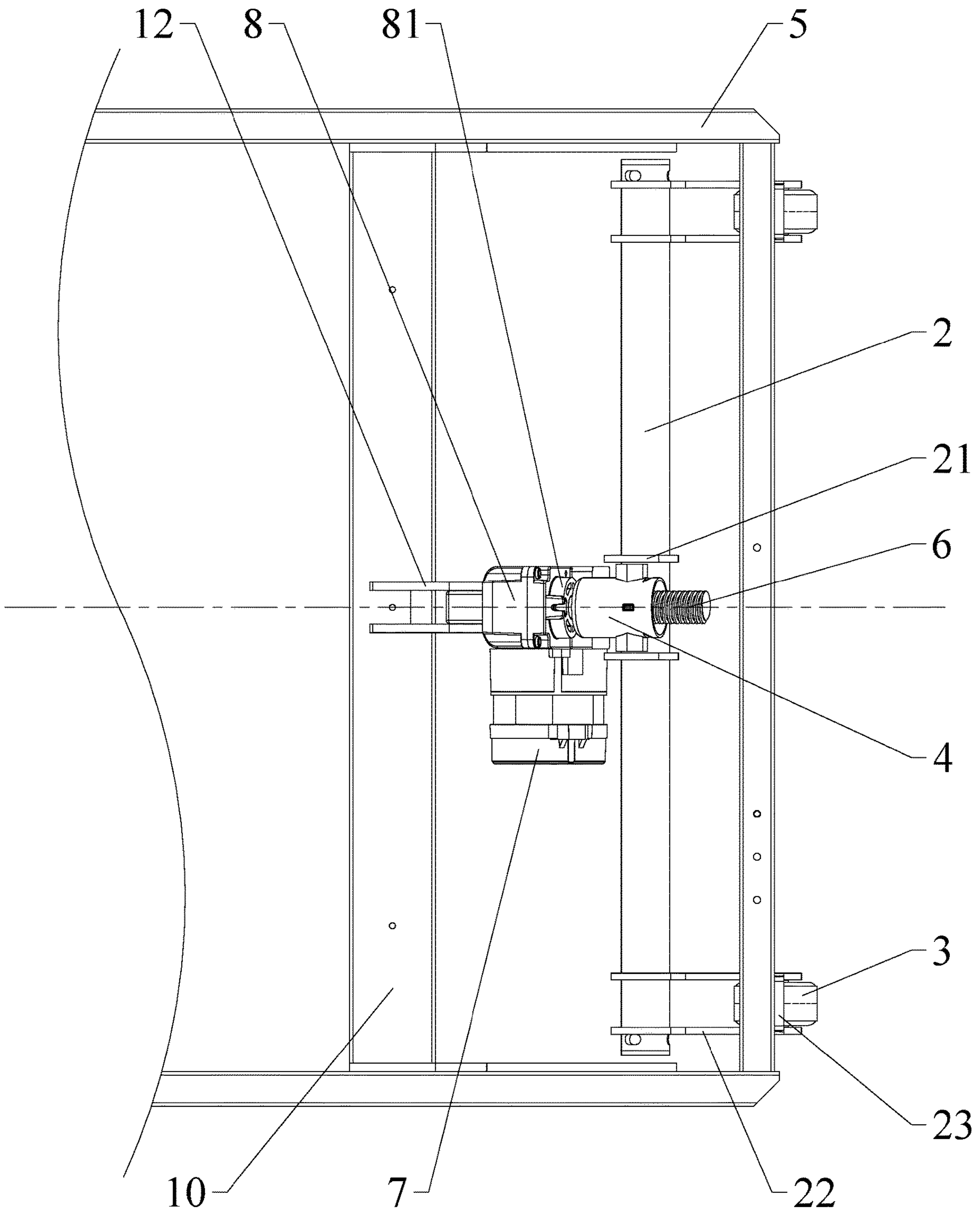
FIG. 5 is a top plan view according to an embodiment of the present invention.
Figure 6:
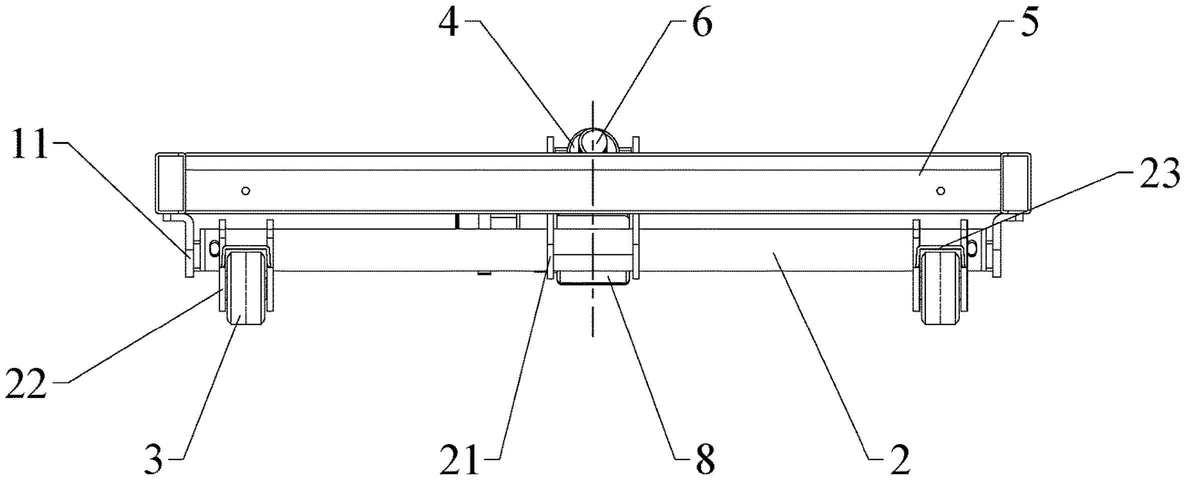
FIG. 6 is a rear view according to an embodiment of the present invention.

With reference to FIG. 1 to FIG. 6, the present invention provides a lifting mechanism for gym equipment, comprising a bracket 1, a bearing rotational shaft 2, bearing wheels 3, a sleeve pipe 4, and a driver A;

- the bracket 1 is configured to be removably mounted to a gym equipment structural frame 5;
- the bearing rotational shaft 2 is rotationally mounted between two ends of the bracket 1, and is also positioned parallel to the bracket 1;
- a peripheral surface of the bearing rotational shaft 2 is fixedly connected with a first pivot base 21 and a plurality of linkage arms 22; the plurality of linkage arms 22 are oriented to a same direction; and each of the linkage arms 22 is rotationally mounted with a corresponding bearing wheel 3;
- the sleeve pipe 4 is pivotally connected to the first pivot base 21; the sleeve pipe 4 is rotatable with respect the first pivot base 21 on a plane corresponding to a radial surface of the bearing rotational shaft 2;
- the driver A is pivotally connected to the bracket 1; an output end of the driver A is a screw bolt 6; the screw bolt 6 passes through the sleeve pipe 4 and being in threaded connection with the sleeve pipe 4.

According to the above technical solutions, when the screw bolt 6 at the output end of the driver A rotates, the sleeve pipe 4 is driven to move axially on the screw bolt 6, thus driving the bearing rotational shaft 2 to rotate; since the first pivot base 21 and the plurality of linkage arms 22 are fixedly connected with the bearing rotational shaft 2, rotation of the bearing rotational shaft 2 will also rotate the bearing wheels 3 which will then be driven to move axially forth or back, and such axial movement of the bearing wheels 3 will lift up or lower the bearing rotational shaft 2; while the bearing rotational shaft 2 is being lifted up or being lowered, a distance between the bearing rotational shaft 2 and the gym equipment structural frame 5 remains unchanged, thus the gym equipment can be adjusted to be lifted or lowered. Since the screw bolt 6 and the sleeve pipe 4 are in threaded connection, self-locking can be achieved so that the gym equipment can be adjusted to a height as desired with structural stability, thus enhancing the safety of use of the gym equipment. Further, since connections between the sleeve pipe 4, the first pivot base 21, the bearing rotational shaft 2, the linkage arms 22 and the bearing wheels 3 are all fixed except that the sleeve pipe 4 is pivotally connected to the first pivot base 21, lifting up of the bearing wheels 3 to fold against the gym equipment structural frame 5 through the pivotal connection between the sleeve pipe 4 and the first pivot base 21 will thus carry the linkage arms 22, the bearing rotational shaft 2, and also the first pivot base 21 together to fold against the gym equipment structural frame 5; alternatively, the bracket 1 may be dismounted from the gym equipment structural frame 5; both ways as described above can reduce the thickness of the gym equipment, thereby lowering the packaging, transportation, and storage costs. Moreover, since the bracket 1 can be dismounted from the gym equipment structural frame 5, the present invention can be independent from the gym equipment structural frame 5, meaning that the present invention can be additionally mounted to the gym equipment to modify the gym equipment without the need to replace a new gym equipment structural frame 5 which is specifically designed to be adaptable to the present invention.

Some embodiments of the present invention are described below.

The bracket 1 comprises a lateral rod 10; two ends of the lateral rods are connected with two connecting rods 11 respectively; the two connecting rods 11 are parallel to each other; an upper surface of each of the connecting rods 11 is configured to be detachably mounted to the gym equipment structural frame 5 by for example screws; one end of each of the connecting rods 11 is connected with a corresponding end of the lateral rod 10 of the bracket 1 so that each of the connecting rods 11 is perpendicular to the lateral rod 10 of the bracket 1, another end of each of the connecting rods 11 is connected to a corresponding end of the bearing rotational shaft 2 so that the bearing rotational shaft 2 is rotationally mounted between the two connecting rods 11.

A second pivot base 12 is fixedly connected to the bracket 1 at a position corresponding to the first pivot base 21 of the bearing rotational shaft 2; the driver A is pivotally connected to the second pivot base 12.

Further, both the first pivot base 21 and the second pivot base 12 are located on a central axis of the bracket 1; a central axis of the screw bolt 6 coincides with the central axis of the bracket 1. Accordingly, it is ensured that the entire mechanism receives balanced force such that its structure is more stable.

Further, a pivot point 100 between the second pivot base 12 and the driver A and a pivot point 200 between the first pivot base 21 and the sleeve pipe 4 are located above an upper surface of the lateral rod 10 of the bracket 1, so that the driver A and the sleeve pipe 4, when being installed, can be enclosed as much as possible in an area surrounded by the gym equipment structural frame 5, and therefore parts of the driver A and the sleeve pipe 4 located at a height below the bracket 1 can be reduced as much as possible. Accordingly, the entire mechanism has a reduced thickness; specifically, after the bearing wheels 3 are folded against the gym equipment structural frame 5, the entire mechanism has a further reduced thickness.

The plurality of linkage arms 22 are mounted on the peripheral surface of the bearing rotational shaft 2 proximal to two ends of the bearing rotational shaft 2 respectively; in other words, the plurality of linkage arms 22 comprises two linkage arms 22 orienting to the same direction. One end of each of the linkage arms 22 is fixedly connected to the peripheral surface of the bearing rotational shaft 2 by for example welding, and another end of each of the linkage arms 22 is mounted with a corresponding bearing wheel 3. During storage or packaging, the linkage arms 22 may be folded to be coplanar with the bracket 1 so that the bearing wheels 3 will not be exposed downwardly from a plane where the bracket 1 is positioned, such that the thickness of the entire mechanism is reduced at a folded state. Of course, a number of the bearing wheels 3 can be adjusted, and a number and positions of the linkage arms 22 may be adjusted accordingly.

Besides, said another end of each of the linkage arms 22 is also mounted with a U-shaped blocking piece 23 covering a top side of the corresponding bearing wheel 3. A maximum folding of the bearing wheels 3 against the gym equipment structural frame 5 is defined when the U-shaped blocking piece 23 of each of the linkage arms 22 abuts against a bottom surface of the gym equipment structural frame 5, so that the bearing wheels 3 are prevented from being in contact with the gym equipment structural frame 5. Hence, the U-shaped blocking piece 23 serves both supporting and protecting purposes.

The driver A comprises a electric motor 7 and a driver base 8; the driver base 8 is pivotally connected to the bracket 1 (i.e. to the second pivot base 12 of the bracket 1); the screw bolt 6 is rotationally inserted into a surface of the driver base 8 facing towards the bearing rotational shaft 2; the electric motor 7 is mounted at one lateral side of the driver base 8; the electrical motor 7 is connected with the screw bolt 6 to transmit motion to the screw bolt 6. As the electric motor 7 is activated, the electric motor 7 will drive the screw bolt 6 to rotate about its own central axis, and due to the threaded connection between the screw bolt 6 and the sleeve pipe 4, the sleeve pipe 4 will be driven to move axially on the screw bolt 6 along an axis of the screw bolt 6, and thus the bearing rotational shaft 2 will be driven to rotate so that a height between the bearing wheels 3 and the gym equipment structural frame 5 can be adjusted, thereby achieving height adjustment of the gym equipment structural frame 5 with respect to the ground. Space is more efficiently utilized to configure the electric motor 7 at one lateral side of the driver base 8, so that the mechanism of the present invention can be more easily folded.

Further, a bearing 81 is mounted on the driver base 8; one end of the screw bolt 6 is rotationally mounted in the bearing 81.

A control console of the gym equipment may also be electrically connected with the driver A to control the operation of the driver A, so that the gym equipment can achieve height adjustment.

The bracket 1 and the gym equipment structural frame 5 are made of metals.

The embodiments and drawings are not intended to limit the form and type of the present invention. Any appropriate changes or modifications made by a person skilled in this field of art should be considered not deviated from the scope of the present invention.

What is claimed is:

1. A lifting mechanism for gym equipment, comprising:
   a bracket, a bearing rotational shaft, bearing wheels, a sleeve pipe, and a driver;
   the bracket is configured to be removably mounted to a gym equipment structural frame;

the bearing rotational shaft is rotationally mounted between two ends of the bracket, and is also positioned parallel to the bracket;
   a peripheral surface of the bearing rotational shaft is fixedly connected with a first pivot base and a plurality of linkage arms; the plurality of linkage arms are oriented to a same direction; and each of the linkage arms is rotationally mounted with a corresponding one of the bearing wheels;
   the sleeve pipe is pivotally connected to the first pivot base;
   the driver is pivotally connected to the bracket; an output end of the driver is a screw bolt; the screw bolt passes through the sleeve pipe and being in threaded connection with the sleeve pipe.

2. The lifting mechanism for gym equipment of claim 1, wherein the bracket comprises a lateral rod; two ends of the lateral rod are connected with two connecting rods respectively; the two connecting rods are parallel to each other; an upper surface of each of the connecting rods is configured to be detachably mounted to the gym equipment structural frame; one end of each of the connecting rods is connected with a corresponding end of the lateral rod of the bracket so that each of the connecting rods is perpendicular to the lateral rod of the bracket, another end of each of the connecting rods is connected to a corresponding end of the bearing rotational shaft so that the bearing rotational shaft is rotationally mounted between the two connecting rods.

3. The lifting mechanism for gym equipment of claim 1, wherein a second pivot base is fixedly connected to the bracket at a position corresponding to the first pivot base of the bearing rotational shaft; the driver is pivotally connected to the second pivot base.

4. The lifting mechanism for gym equipment of claim 3, wherein both the first pivot base and the second pivot base are located on a central axis of the bracket; a central axis of the screw bolt coincides with the central axis of the bracket.

5. The lifting mechanism for gym equipment of claim 3, wherein a pivot point between the second pivot base and the driver and a pivot point between the first pivot base and the sleeve pipe are located above an upper surface of the lateral rod of the bracket.

6. The lifting mechanism for gym equipment of claim 5, wherein the plurality of linkage arms are mounted on the peripheral surface of the bearing rotational shaft proximal to two ends of the bearing rotational shaft respectively; one end of each of the linkage arms is fixedly connected to the peripheral surface of the bearing rotational shaft, and another end of each of the linkage arms is mounted with the corresponding one of the bearing wheels.

7. The lifting mechanism for gym equipment of claim 6, wherein said another end of each of the linkage arms is also mounted with a U-shaped blocking piece covering a top side of the corresponding bearing wheel.

8. The lifting mechanism for gym equipment of claim 1, wherein the driver comprises a electric motor and a driver base; the driver base is pivotally connected to the bracket; the screw bolt is rotationally inserted into a surface of the driver base facing towards the bearing rotational shaft; the electric motor is mounted at one lateral side of the driver base; the electrical motor is connected with the screw bolt to transmit motion to the screw bolt.

9. The lifting mechanism for gym equipment of claim 8, wherein a bearing is mounted on the driver base; one end of the screw bolt is rotationally mounted in the bearing.

* * * * *